United States Patent
Moulton et al.

(10) Patent No.: US 6,778,252 B2
(45) Date of Patent: Aug. 17, 2004

(54) FILM LANGUAGE

(75) Inventors: William Scott Moulton, Kentfield, CA (US); Steven Wolff, Woodacre, CA (US); Rod Schumacher, Los Angeles, CA (US); Andrew Bryant, San Diego, CA (US); Marcy Hamilton, Los Angeles, CA (US); Strath Hamilton, Los Angeles, CA (US); Dana Taschner, Sunset Beach, CA (US)

(73) Assignee: Film Language, Los Angeles, CA (US)

( * ) Notice: Subject to any disclaimer, the term of this patent is extended or adjusted under 35 U.S.C. 154(b) by 53 days.

(21) Appl. No.: 10/027,191

(22) Filed: Dec. 20, 2001

(65) Prior Publication Data

US 2002/0097380 A1 Jul. 25, 2002

Related U.S. Application Data

(60) Provisional application No. 60/257,660, filed on Dec. 22, 2000.

(51) Int. Cl.[7] .............................................. G03B 31/00
(52) U.S. Cl. .............................. 352/12; 352/5; 352/23; 352/25
(58) Field of Search .............................. 352/5, 12, 23, 352/25

(56) References Cited

U.S. PATENT DOCUMENTS

| | | | | |
|---|---|---|---|---|
| 5,502,790 A | * | 3/1996 | Yi | 704/256 |
| 5,608,839 A | * | 3/1997 | Chen | 704/235 |
| 5,615,301 A | * | 3/1997 | Rivers | 704/277 |
| 5,630,017 A | * | 5/1997 | Gasper et al. | 704/276 |
| 5,657,426 A | * | 8/1997 | Waters et al. | 704/276 |
| 5,729,694 A | | 3/1998 | Holzrichter et al. | |
| 5,818,461 A | | 10/1998 | Rouet et al. | |
| 5,826,234 A | | 10/1998 | Lyberg | |
| 5,880,788 A | | 3/1999 | Bregler | |
| 5,884,267 A | | 3/1999 | Goldenthal et al. | |
| 6,097,381 A | | 8/2000 | Scott et al. | |

OTHER PUBLICATIONS

Bregler et al, "Video Rewrite: Driving Visual Speech with Audio," ACM Siggraph 97, Interval Research Corporation, No. 97, (Mar. 8, 1997).

Ezzat et al, "Mike Talk: A talking Facial Display Based on Morphing Techniques," Proceedings of Computer Animation Conference, (Jun. 8, 1998).

Ezzat et al, "Visual Speech Synthesis by Morphing Visemes," A.I.Memo, MIT, No. 165, (Mar. 8, 1999).

Brand et al, "Voice–Driven animation," TR–98–20, Mitsubishi Electric Research Laboratory, (Mar. 8, 1998).

Burnett et al, "Direct and Indirect Measures of Speech Articulator Motions Using Low Power EM SEnsors," XIV International Congress of Phoenetic Sciences, Lawrence Livermore National Laboratory, (Mar. 8, 1999).

(List continued on next page.)

*Primary Examiner*—Rodney Fuller
(74) *Attorney, Agent, or Firm*—Sanford Astor

(57) ABSTRACT

A method for modifying an audio visual recording originally produced with an original audio track of an original speaker, using a second audio dub track of a second speaker, comprising analyzing the original audio track to convert it into a continuous time coded facial and acoustic symbol stream to identify corresponding visual facial motions of the original speaker to create continuous data sets of facial motion corresponding to speech utterance states and transformations, storing these continuous data sets in a database, analyzing the second audio dub track to convert it to a continuous tune coded facial and acoustic symbol stream, using the second audio dub track's continuous time coded facial and acoustic symbol stream to animate the original speaker's face, synchronized to the second audio dub track to create natural continuous facial speech expression by the original speaker of the second dub audio track.

34 Claims, 2 Drawing Sheets

OTHER PUBLICATIONS

Holzrichter et al, "Human Speech Articulator Measurments Using Low Power , 2 GHz Honodyne Sensors," 24th International Conference of Infrared and Millimeter Waves, Lawrence Livermore National Laboratory, (Mar. 8, 1999).

Burnett et al , "The Use of Glottal Electromagnetic Micropower Sensors (GEMS) in Determining a Voiced Excitation Function," 138th Meeting of the Acoustical Society of America, Lawrence Livermore National Laboratory, (Mar. 8, 1999).

Pentland et al, "View–Based and Modular Eigenspaces for Face Recognition," MIT Media Laboratory, IEEE Conference on Computer Vision & Pattern Recognition, (Mar. 8, 1994).

* cited by examiner

FILM LANGUAGE

This invention is described in our provisional patent application No. 60/257,660 filed on Dec. 22, 2000.

BACKGROUND OF THE INVENTION

1. Field of the Invention

The present invention relates generally to cinematic works, and particularly to altered cinematic works where the facial motion and audio speech vocal tract dynamics of a voice dub speaker are matched to animate the facial and lip motion of a screen actor, thereby replacing the sound track of a motion picture with a new sound track in a different language.

2. Background of the Invention

In the field of audio dubbing, there are many cinematic and television works where it is desirable to have a language translation dub of an original cinematic or dramatic work, where the original recorded voice track is replaced with a new voice track. In one case, it is desirable to re-record a screen actor's speech and dub it onto the original visual track. In another case it is desirable to have the audio dub be exactly synchronized with the facial and lip motions of the original cinematic speaker. Instead of needing to re-shoot the actor speaking the scene again, the dubbing process provides an opportunity to change the voice.

Prior approaches to generating lip and mouth motion synchronization to new voice sound tracks have largely been manual processes using computer audio and graphical processing and special effects tools. There have been recent developments towards automating the voice dubbing process using 2D based techniques to modify archival footage (Bregler), using computer vision techniques and audio speech recognition techniques to identify, analyze and capture visual motions associated with specific speech utterances. Prior approaches have concentrated on creating concatenated based synthesis of new visuals to synchronize with new voice dub tracks from the same or other actors, in the same or other languages. This approach analyzes screen actor speech to convert it into triphones and/or phonemes and then uses a time coded phoneme stream to identify corresponding visual facial motions of the jaw, lips, visible tongue and visible teeth. These single frame snapshots or multi-frame clips of facial motion corresponding to speech phoneme utterance states and transformations are stored in a database, which are then subsequently used to animate the original screen actor's face, synchronized to a new voice track that has been converted into a time-coded, image frame-indexed phoneme stream.

Concatenated based synthesis relies on acquiring samples of the variety of unique facial expression states corresponding to pure or mixed phonemes, as triphones or diphones. The snapshot image states, or the short clip image sequences are used, as key frame facial speech motion image sets, respectively, and are interpolated for intermediate frames between key frames using optical morph techniques. This technique is limited by being essentially a symbol system that uses atomic speech and facial motion states to synthetically continuously animate facial motion by identifying the facial motions and interpolating between key frames of facial motion. The actual transformation paths from first viseme state to second viseme state are estimated using either short clips, or by hand, frame to frame, or estimated by standard morph animation techniques using various functions curved to smooth the concatenation process.

BRIEF SUMMARY OF THE INVENTION

The invention comprises a method for accumulating an accurate database of learned motion paths of a speaker's face and mouth during speech, and applying it to directing facial animation during speech using visemes.

Visemes are collected by means of using existing legacy material or by the ability to have access to actors to generate reference audio video "footage". When the screen actor is available, the actor speaks a script eliciting all the different required phonemes and co-articulations, as would be commonly established with the assistance of a trained linguist. This script is composed for each language or actor on a case by case basis. The script attempts to elicit all needed facial expressive phonemes and co-articulation points.

The sentences of the script first elicit speech-as-audio, to represent mouth shapes for each spoken phoneme as a position of the mouth and face. These sentences then elicit speech-as-motion, to derive a requisite range of facial expressive transformations. Such facial transformations include those as effected from (1) speaking words for capturing the facial motion paths as a variety of diphones and triphones needed to represent the new speech facial motions, and (2) making emotional facial gestures. Common phoneme range elicitation scripts exist as alternate sets of sentences, which are used to elicit all the basic phonemes, such as the "Rainbow Passage" for example. To elicit all types of transformation between one phoneme and another requires using diphones, the sound segment that is the transformation between one phoneme and another, for all the phonemes. As Bregler confirmed in U.S. Pat. No. 5,880,788, triphones can have many thousands of different transformations from one phoneme sound and corresponding mouth shape to another. Triphones are used to elicit the capture of visual facial and mouth shape transformations from one speech phoneme mouth position dynamically to another phoneme mouth position and capture the most important co-articulation facial motion paths that occur during speech.

The actual motion path of a set of fixed reference points, while the mouth moves from one phoneme to another, is recorded and captured for the entire transformation between any set of different phonemes. As the mouth naturally speaks one speech phoneme and then alters its shape to speak another phoneme, the entire group of fixed reference points move and follow a particular relative course during any phoneme to phoneme transformation. Triphones capture the requisite variety of facial and mouth motion paths. Capturing many examples of many of these different phoneme to phoneme mouth shape transformations from a speaking actor is completed.

There are two sources of capture: target footage and reference footage. The target footage is the audio visual sequence. Elicitation examples are selected to accommodate the phoneme set of the language of the target footage, creating a database. This database of recorded mouth motions is used as a training base for a computer vision motion tracking system, such as the eigen-images approach described in Pentland et al, "View-Based and Modular Eigenspaces for Face Recognition", Proceedings of the IEEE Computer Society Conference on Computer Vision and Pattern Recognition, June 1994, pps. 84–91. The computer vision system analyzes the training footage by means of practicing its vision analysis on the visual footage to improve fixed reference point tracking and identification for each frame. A speech recognition system or linguist is used to recognize phonemes in the training footage which can be used as index points to select frames for usage as visemes.

If the training footage is of a screen actor, it permits a computer vision motion tracking system to learn the probable optical flow paths for each fixed reference point on the face for different types of mouth motions corresponding to phoneme transitions. These identified and recorded optical reference point flow paths during speech facial motions are recorded and averaged over numerous captured examples of the same motion transformations.

A database of recorded triphone and diphone mouth transformation optical flow path groups are accumulated. For commonly used speech transformations, commonly used spline based curve fitting techniques are applied to estimate and closely match the recorded relative spatial paths and the rate of relative motions during different transformations. The estimated motion path for any reference point on the face, in conjunction with all the reference points and rates of relative motion change during any mouth shape transformation, is saved and indexed for later production usage.

An emotional capture elicitation process is effected by having the actor get in the mood of a list of different basic emotional expressions. The actor then performs and visually records examples of those emotional expressions and changes. These expressions and changes are simultaneously recorded with more than one camera position, such as face forward, one of three-quarter profile left, or three-quarter profile right side, or lower upward looking face shot, or head level in full profile. Examples are recorded as static image positions of the face, and also as short audio video clips of mouth motion. This includes recording examples of the emotional expressions with closed mouth and different open mouth vowels, for greater accuracy.

The two dimensional facial image of the actor is initially manually overlayed with a finite number of control points. These points have been established commonly within the animation industry and prior techniques applied to human actors to control facial motion animation, including Adobe's After Effects, Pinnacle Systems' Commotion DV 3.1 video compositor tool, Discreet's Flame and Pixels3D animation tool, for example.

This initial establishment of fixed reference control points mapped on one or more reference images of an actor's face is usually done manually. The points include key facial features, such as a constellation of points that outline the chin, the outside of the mouth and the inside edge of the lips. The facial and mouth expressive motion paths are tracked using common techniques established in computer vision, including the eigen-images approach described in the Pentland et al algorithm. The commonly available computer vision techniques track the motion of the predesignated control points for the face and learn to follow and annotate all image frames with the position of the mouth.

The elicited reference audio-visual database is then supplemented by the original target screen footage, to be re-synchronized to another language. The computer vision tracks and estimates the position of the control points mapped to the mouth as they move in the target production footage.

Each facial image viseme represents a specific facial expressive primitive of the voice for different phonemes. The morph target transformation subsystem has learned, from the computer vision analysis on a real actor, to acquire and tune the right optical path transform for each different actor expressive transformation. These transformations can include speech and emotional expression, and idiosyncratic gesture based expressions.

2D visemes are mapped and controlled using X/Y points, and after the texture map of a 2D viseme capture is normalized to a 3D model size, it is then mapped onto a 3D facial muzzle model, where the X/Y points representing fixed reference control points now become what are called 'CV's or control vectors, in the 3D facial model.

Sizing the viseme to fit the actor on screen facial position, scale and orientation is done using either manual or automatic techniques. The manual approach is to hand place a model wireframe overlay onto an image frame, and rotate it for correct orientation on X and Y axes (virtual camera angle) and scale it for correct matching apparent distance to the camera. The 3D wireframe overlay is used as a guide to exactly fit and wrap the 2D viseme muzzle to the 3D wireframe. The 3D wireframe is then fitted to match the 2D original actor head and face orientation. The wireframe is moved to fit, with the human operator visually adjusting the placement of the wireframe for each frame. The last match moved visemes from the prior frame are incrementally moved and scaled and rotated to fit the current frame image of the actor head and face muzzle.

The viseme CV fixed reference control points are exactly registered to the original screen actor facial position for the eyes and nose position, to place them exactly to the head position, scaled to the correct size. The moving and scaling and positioning actions are done manually using standard 3D computer graphics overlay and compositing tools, such as Pixels3D. The actor viseme associated with the new dub track for the image frame is applied. The applied visemes are aligned and registered to the correct position of the screen actor's face either manually or preferably by using computer vision registration techniques, such as an automatic visual tracking algorithm to identify the lip and jaw edge boundaries of the screen actor's face. Contour tracking algorithms can be used to identify the outside edges of the actor's lips. A useful contour tracking algorithm is described in Kaas et al, "SNAKES: Active Contour Models", Proc. Of the First International Conference On Computer Vision, London 1987.

Another computer vision tracking approach can be more suitably applied to lower resolution images, such as video, using a gray scale level based algorithm such as the eigen-images approach described in Pentland et al. The computer vision system identified locations of the boundaries of the lips and jaw permits the automatic placement and registration of new dub track visemes to fit the original screen actor facial positioning. The viseme muzzle patches are selected from the actor viseme database based on the dub speech script and speech recognition derived phoneme-to-viseme match sequence. The sequence of visemes is locked into place and correct orientation and scale in the actor image, and then the viseme muzzle patches are altered to match the light, color, and texture of the original screen actor muzzle, which alteration is enabled through mapped samples from the original screen actor images as seed texture patch references for a plurality of muzzle area texture patches. The visual texture, light and hue of the screen actor muzzle patch samples are applied to the viseme muzzle patch. The actor viseme is texture matched and match lighted for the screen actor viseme to be applied for the image frame being processed. The viseme muzzle patch boundary is matched when visually, it seamlessly stitches to the original screen actor surrounding face in the original footage. The result is such that the image frames show sequential lip motion that is now visually synchronized to the new dub speech track.

In one embodiment of the invention the sampling of texture patches from the screen actor image is automatically performed. This is accomplished at the point for the production 'footage', that speech visemes are first identified through voice recognition. The identified visemes are scaled, rotated, and locked into correct vertical and three dimensional orientation relative to the camera, to match the screen actor head and face in the performance. The whole muzzle as well as patches of light, color and texture from the sampled corresponding original actor muzzle in an image frame is collected as a set of patches. These patches are stored and mapped relative to known wireframe control vertices. These are later used as seeds to paint and smooth the actor reference viseme muzzle patch image to match the actor original performance image lighting and color. The process of texture matching the reference actor viseme muzzle patch to the original screen performance actor facial lighting can be manually or automatically accomplished. The lighting and color altered reference viseme muzzle patch sufficiently matches the original screen actor image, in terms of hue, saturation, lightness, lighting angle, shadow, skin texture, motion blur and atmospheric diffusion, for example. When texture mapping is completed for all screen visemes, the facial muzzle wireframe morph transformation is also effected for the visual texture maps. The morph process generates in-between images from viseme-to-viseme. The morphing of a viseme with another viseme over time produces a bi-viseme, which is equivalent to a speech diphone. Morphing generates intermediate image frames between visemes occurances in the footage. The morph transformation is applied to the wireframe model and also the locked visual texture map. Morphing generates any intervening image frame for mouth, lip and jaw muzzle shape positioning during speech. The applied reference visemes may or may not have their control vertices positions specially modified to represent more than the one facially expressive channel for the footage, as possibly detected within the original footage.

The present invention includes the unique provision for producing composite visemes on the fly. This is accomplished by means of using continuous dub speaker radar measurement, or applying actor speech facial motion tracking techniques, or using multi-channel character animation techniques, such as used in Pixels3D, to iteratively approximate, model and decompose original actor screen footage into usable components for creating the new actor facial animation. Facial expression is a complex compliment of usually one or more channels of expressive influence. Character animation control environments such as Pixels3D, provide the ability to combine an unlimited number of different channels of expressive extent (relative to no expression) and relative control vertices motion path transformations within an expression.

In one embodiment of the invention, radar is used as a mechanism to acquire the motion dynamics of speech as mouth and lip motions, in addition to inner vocal tract motion dynamics. The positions of the lips and the jaw of a dub audio track speaker are recorded using radar. The dynamics of motion of the dub speaker are scaled to match the dynamic range of motion of the screen actor lips and jaw. This is accomplished by means of having a reference set of image frame visemes for the screen actor that can be used as reference motion dynamic measures for various mouth and lip motions during speech. The actor visemes are scaled to the actor. The dub speech radar track measurements are absolute values that are referenced to a particular phoneme or phoneme-to-phoneme transition in time. The automatically recognized phonemes in the dub track are used to select the actor viseme corresponding to the phoneme. The actor viseme and all its associated control vertices are automatically indexed to a dub track radar measurement value. The subsequent actor viseme in the speech sequence is also indexed to the corresponding dub speech track radar measurement value. The difference between the dub speaker's radar absolute dimensional measurements for different speech phoneme utterances, and the actor's absolute dimensions is normalized, so that the radar track reading is scaled to match the dimensions of screen actor for the reference viseme dimensional equivalents. The radar measurement of the lips and the jaw in terms of extent and scale are modified from the dub track speaker to match the screen actor face and motion extents. The scaled radar measurement track is then used to directly articulate the morph path of all the associated control vertices between the actor visemes in sequence in the image track.

In one embodiment of the present invention, radar measurements produced from a dub speaker, a screen actor normalized dynamic motion path for the lips or the jaw for the dub track, and this normalized radar motion track for the lips, is automatically analyzed to identify deviations from the dub speaker's reference motion set for the same phonemes, which deviations may be additionally associated with emotional expression or actor facial quirks, or other idiosyncrasies. Each discrete phoneme and emotional expression and idiosyncratic facial motion is recorded and stored into a database of face shapes, which can have an applied amplitude of zero, or no application, or up to 1, representing the maximum dimensional extent of the control vertices as a set for that discrete expression or mouth shape.

In one embodiment of the invention, radar captured lip motion measurements are stored as motion path information that is used to control the relative motion paths of the control vertices of the morph paths for the selected viseme morphing to be applied. After scaling normalization between dub speaker and screen actor mouth shape and motion extents, any remaining discrepancies between reference viseme control vertices and actual motion paths are automatically incorporated and alter the reference viseme to an offset control vertices set for that viseme application. The automatically incorporated viseme offsets to control vertices may contain emotional or other non-speech expressive content and shape. The degree of viseme offset may be given a separate channel control in a multi-channel mixer approach to animation control. Thus, any radar measurement motion tracking of the lip position may be separated into discreet component channels of shape expression.

For example, each phoneme, each vowel and each emotion and each idiosyncratic expression can have a separate channel. At any moment in time, one or more channels are being linearly mixed to produce a composite motion path of the control vertices and thus a composite facial expression and lip position. In this embodiment, radar measurements are used to control the dynamic morph transformations of the images and to generate a real-world composite measurement of multiple influence, including speech, emotion and other expression. The animation modeling tool then is applied to analyze the real-world radar captured motion paths of facial expression and lip motion and knowing the speech track, effects a decomposition of the motion track into multiple facial animation mixer channels. This is analogous to decomposition of a complex audio signal into it's component sine waves, such as is accomplished using Fourier series analysis for example. The algorithm for identifying the discreet components of expression that combine into a composite expression, is to iteratively subtract known and expected channel components from the composite shape amplitude, and by process of approximation and reduction, identify all the probable discreet sources of expressive shape and extent.

In another embodiment of the invention the actual speech of the dub actor track is modified using vocal tract modeling or other conventional techniques such as Prosoniq's Time Factory, to effectively morph the audio tonal and pitch characteristics of the dub actor's voice to match the screen actor voice.

DETAILED DESCRIPTION OF THE INVENTION

Figure 1:
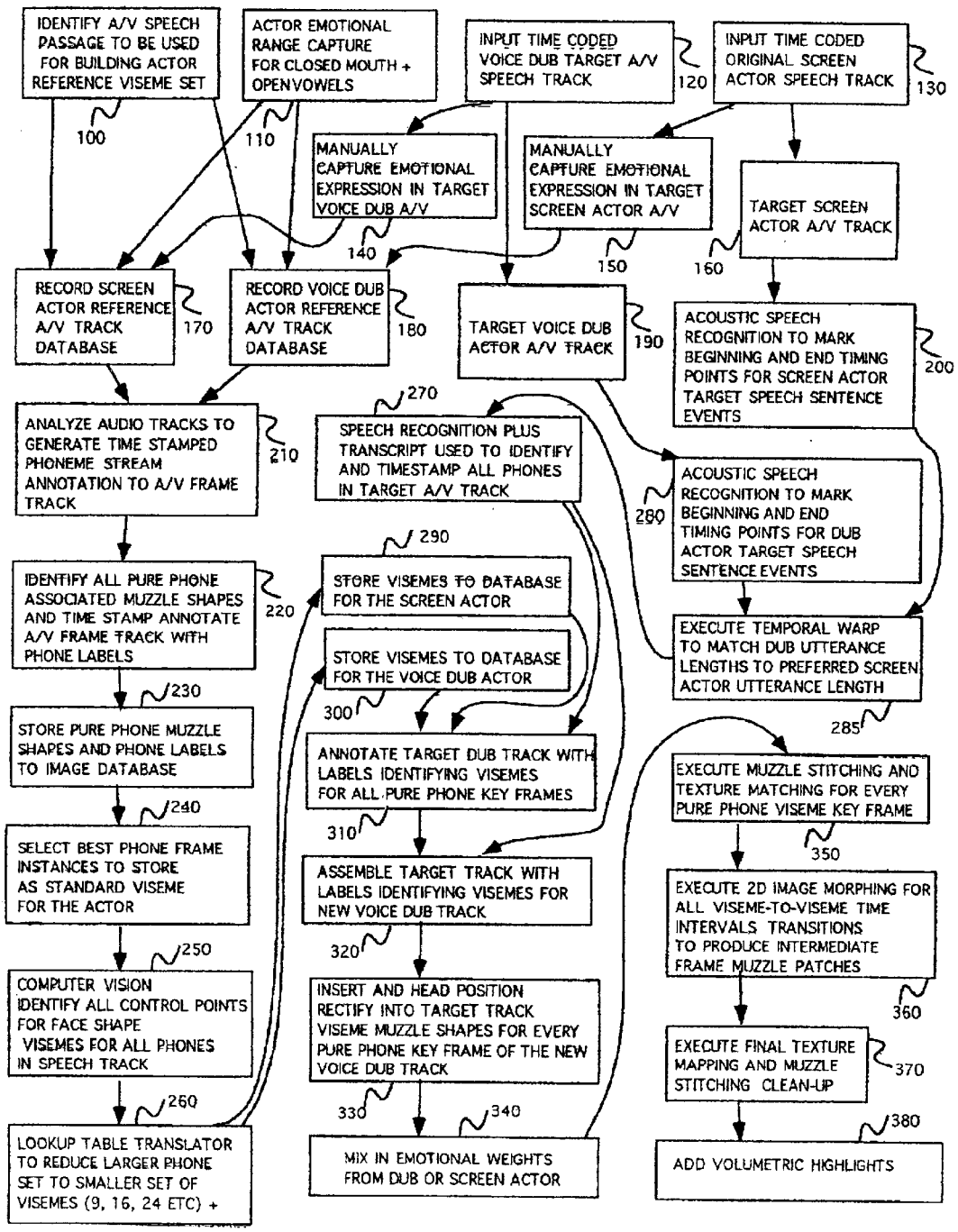
FIG. 1 is a block diagram of the audio-visual dubbing system.

In order to execute morph animation of a 2D source speaker muzzle, a 3D muzzle model is used. The speech track is time-stamped to frames. (FIG. 1, Block 130 and 170). Computer voice recognition of the original recorded speech track is executed. (FIG. 1, Block 210, 200,) The voice recognition can be additionally aided by working with a prior known speech text transcript. The voice recognition system generates a time-stamped annotation database of individual frames and associated computer estimated phonemes and diphones, and the estimated pure or mixed phoneme combination corresponding to the frame. Speech phonemes are time-stamped every millisecond for the audio footage. (FIG. 1, Block 220 and 270)

A 3D wireframe model of a human facial muzzle is overlayed and rectified to the source 2D footage on a frame by frame basis. (FIG. 1, Block 330). The wireframe model is scaled and positioned and oriented as an overlay model onto the original audio/visual (A/V) footage, so that the wireframe head and muzzle follows and matches the 2D footage actor. This can be accomplished by hand or by means of computer vision analysis techniques with some occasional human fine tuning of the model overlay fitting. (FIG. 1, Block 330)

A computer vision system tracks the (a) head position, (b) the facial motions for the jaw and (c) the lip motion during speech. (FIG. 1, Block 250). This develops a database of computer estimated positions of control reference points for the head as a whole and for the facial muzzle area including the jaw and lips. (FIG. 1, Block 250).

The computer vision system analyzes each frame of original A/V footage while speech is occurring to track the motion of the chin and lips on the 2D facial muzzle. (FIG. 1, Block 250).

Control reference points are initialized using a human to find and affix computer overlay of points to the face and head of a speaker in the footage. These sets of points are tracked by the computer vision system to estimate their position on a frame to frame basis. The point positions per frame are estimated after computer vision techniques identify the edges and lines associated with the points in the A/V footage of the speaker. (FIG. 1, Block 250). The positions of fixed reference points on the face are estimated per frame by the computer vision system, and the motion paths these points take frame to frame during speech is recorded. (FIG. 1, Block 250).

The motion paths of the recorded speech for known recognized speech phoneme to phoneme transitions are recorded for the original A/V 2D footage (FIG. 1, Block 170). The position of the mouth for all pure phonemes is annotated in the database. (FIG. 1, Block 250)

The facial position and orientation in the original A/V footage is estimated for each frame, and recorded as a number of degrees offset from standard face front forward position, including estimated camera angle. This can be done by hand or by using computer vision analysis technique including Affine transformations to estimate the plane of head orientation in the archival footage, and eigenvector estimation techniques to track edges, to identify a finite set of fixed reference points on the face which are used as the control points. (FIG. 1, Block 250)

These facial fixed reference control points are common throughout the production process, and include points on the outside and inside edges of the lips, points on the edge of the chin, a point for the tip of the tongue, a point for the bottom edge of the upper teeth, a point for the upper edge of the lower teeth, and points for the nose, and eyes. All these points are connected to surfaces that can be recognized as edges by the computer vision system. There are 55 points total being recognized and mapped in the archival footage and on the dub actor, if used. (FIG. 1, Block 250)

The standard fixed reference control points on the human face are common for (a) the animation wireframe reference model using a character model head articulation subsystem, (b) the archival actor capture database subsystem, (c) the dub actor capture database subsystem, (d) the standard reference and individual actor speech motion path reference database subsystem, (e) the morph transformation subsystem, and the (f) animation rendering subsystem. This commonality of references from wireframe through to final animation is important standardization for streamlining the production process. It permits the automatic unification of a production template character animation head model to particular actors and speakers.

The head wireframe mesh model is a spline point wireframe model that is fitted to that of a target actor speaker head and speech related mouth motion. The 2D control point tracking and 3D morph animation subsystems form a method which permits rectification between different actor head models, so that a captured dub actor's differences in absolute and motion dimension measurements are easily modified to fit the target original footage speaker or actor head dimensions and dynamics (FIG. 1, Block 330).

A reference system is used, where system standard head and speech mouth optical motion paths form a reference database norm. The norm model records a given speaker or actor dimensions and dynamics as an offset reference. These references are floating point vectors, assigned to identify the 3D vector coordinate position of any control point for any actor, as an offset to the standard reference head and mouth articulation model. Offsets for a given actor can be selectively preserved and duplicated in the model to be used to generate the new speech track for the archival footage to be modified. The system permits this to be achieved using an easily modified complex model of a generic reference head, where the production engineer conforms the generic model to match the dimensions and dynamics of the target actor or speaker. This includes their mouth positions, range of expressive states, and dynamics of motion during speech.

Common facial fixed reference control points are useful to permit the generic model system size, shape and motion to be modified to closely match the target speaker in the archival footage. The reference animation head model is adjusted to match the speaker's relevant measurements, including absolute head and face dimensions, and mouth position extremities during speech, and mouth motion paths as a whole during any speech transformation available from the capture database. (FIG. 1, Block 290 and 300).

The established database of fixed reference point placement and speech and emotional related motion paths of the points on the face, comes from multiple sources: (a) 3D character animation speech modeling techniques such as those employed for example, in the Pixels3D character animation software, the Autodesk 3D Studio Character software, Intel's Skeletal Character Animation software, Metamotions Gypsy software, Curious Labs Poser 4 character modeling and animation software package. These can provide a standard generic human head reference model to use as a vector database template reference system where all relevant points of the fixed reference points on the face identified during computer vision recognition are also vertices in the 3D wireframe of the head. This generic human speech facial motion model provides a reference point using multi-channel speech and emotional expression articulation schema, such as the Pixels3D animated Gorilla model for example. (b) Another source is archival footage or A/V material of human speakers, including video and film. (c) A third source is from actors currently available to dub the speech and facially mimic other screen facial acting or orientation requirements. (FIG. 1, Block 290 and 300).

The established database imports information learned from the available archival A/V speech for the material. The motion paths during speech of all facially fixed reference control points are estimated for all speech in the track. The audio track is analyzed to identify phoneme transitions within 10 millisecond accuracy, that are recognizable in the archival footage.

Using standard A/V database management techniques, phoneme transitions in the archival footage are annotated as file links to the A/V database audio track indexed both to the audio track in 10 millisecond intervals and on a frame by frame basis.

Each frame is labeled with a best estimate phonemic speech state, whether pure phones or mixed phones. (FIG. 1, Block 240). The voice recognition of the actual phonemes in the archival A/V to be dubbed, permits the ready indexing of the facial speech motion of the original speaker for the purpose of digitally acquiring the specific character of speech of the original actor/speaker speech mouth patterns. These particular speech characteristics of the archival footage speaker are imported as groups of motion paths for particular speech phonemic transformations. The available sample base of archival footage speech provides these samples, or if the actor is currently available, reference footage could be acquired. (FIG. 1, Block 290 and 300).

The 3D facial model in wireframe matches the dimensions of the actor. The 3D facial model orientation is match-moved, for every frame to that of the archival footage actor. The wireframe model is first match moved to fit the absolute head orientation and estimated distance from camera of the screen actor. The wireframe head muzzle is match-moved in 3D space to fit and overlay every head position of the actor for every frame (FIG. 1, Block 330). This can be done by hand, with a human operator using visual estimation techniques, or by automated computer vision techniques, that better estimate head distance and orientation of any actor or speaker in archival footage, in which automatic estimates can be used to make the first match-move placement of the wireframe model to the speaker or actor, and then if necessary, the human operator can visually check the accuracy of the match move placement of the 3D wireframe muzzle.

Using common voice recognition techniques, the dub actor's speech is analyzed to identify pure phoneme peaks in their speech (FIG. 1, Block 180, 190, 210). Phoneme peak points are annotated to the audio track database in 10 millisecond intervals (FIG. 1, Block 220).

Estimated phoneme to phoneme transitions of the dub actor speech track are automatically estimated for each target image frame to be modified, using the pure phoneme reference occurrences recognized by the computer (FIG. 1, Block 310).

Dub actor speech track phonemes are used to select visemes made from and for the target screen actor, which visemes will be used as animation reference index frames (FIG. 1, Block 320). A database of phoneme specific visemes are normalized for an actor. Archival footage, or if available, new reference footage is acquired from the original actor, or if necessary, from a stand-in actor with some similarity to the screen actor. The archival footage is analyzed using voice recognition to identify phonemes in the spoken track. The facial and mouth position during many instances of speaking the same phoneme or phoneme transitions are recorded, compared, and an optimal example of the archival footage speaker is used as a visual image sample of the actor for the phoneme utterance, and becomes the static frame viseme of the actor speaking that phoneme (FIG. 1, Block 240).

There are 46 phonemes used by English speakers, which due to the common mouth shape for multiple phonemes, reduces to a set of as few as 15 visemes (FIG. 1, Block 260). Each of these 15 visemes for a target screen actor are developed and stored in the database. Visemes exist as 2D images derived from archival or other reference sources for the actor, or as specifically acquired from the actor using reference script recording (FIG. 1, Block 260). The 2D visemes are an image map of the face, and also have annotated in them all of the standard facial fixed reference control points (FIG. 1, Block 250, 260). The 2D visemes are wrapped as a texture map onto the wireframe model of the actor, which wireframe has been match moved to the correct orientation and scale (FIG. 1, Block 330). The 2D visemes are assigned to the to-be-modified archival image frame, which visemes are associated to the dub actor speech phoneme track phonemes as annotated in the audio track and referenced to the image frame (FIG. 1, Block 330).

If the dub actor audio track pure phoneme is not sufficiently aligned in the audio time index to the image frame of the selected screen actor viseme, where the pure phoneme occurred between image frames, then this off-set is annotated as an mix between at least two phonemes known in adjacent time.

As a result, the reference image viseme can be pre-morphed to match the dub phoneme mix, exact to the speech transition moment for that image frame, in order to have more frame accurate lip motion animation pre-morph index visemes. In most cases the pure dub track phoneme selected screen actor's 15 visemes are used and no offset pre-morph of the index viseme is necessary (FIG. 1, Block 320). The standard set of 15 visemes for the given actor are texture mapped onto the wireframe that has been match-moved to fit the screen actor head and face and mouth in the archival footage frame (FIG. 1, Block 260).

The lighting, texture, diffusion, color, and shading for every frame of the original actor/speaker are sampled to establish the corrections to be made to the standard actor viseme (FIG. 1, Block 350). Each match moved actor viseme placement has its texture map modified to match the original screen actor's face texture map for the frame. This can be done by hand or computer, sampling different patches of pixels from the corresponding frame in the archival footage and placing the sample patches in the palette to be used to guide the shading and texturizing of the viseme to match the original lighting (using Photoshop, AfterEffects) (FIG. 1, Block 350).

The phoneme indexed database of stored motion paths of associated facial fixed reference points during speech of the screen actor for any speech phoneme transition are applied to the morph engine (FIG. 1, Block 360). This is done by using the recorded motion paths for the control points during screen actor speech phoneme transitions. The associated point group motion paths identified for the screen actor during speech are used to scale and calibrate the motion trajectory of the fixed reference points in the morph animation subsystem. This can be done by hand where the 2D control point path of motion is recorded as a complex vector trajectory path for any phoneme transition.

The fixed reference points on that path are indexed as floating point vector offsets from the generic reference model for the same phoneme transition as articulated by the reference model. The motion path is mapped and used as a static motion path map for the morph animation system when articulating the same phoneme transition.

The motion path relative to transitioning between any two phonemes for the actor is mapped from 2D archival source capture subsystem as an 2D to 3D surface overlay wrap, onto the 3D wireframe actor muzzle model (FIG. 1, Block 330). This is done by taking the actual motion path of any control point and using curve matching, such as using common mathematical techniques for 2D slope estimation, identify slopes and rates of change of slope, and select a spline function that matches the path of that motion vector. 2D spline curves of motion paths are mapped onto a 3D muzzle model and become re-labeled as 3D floating point vector trajectories. The motion path trajectory of any phoneme transition is estimated as a complex spline curve that matches the motion path. The complex spline curve for the motion path of the control point is then used and scaled to the transition interval in time to guide the morph optical flow path for the frame specific placement of control point during morph animation rendering. The database stores these estimated spline curves that match the control point motion path (FIG. 1, Block 290, 300, 360). The splines curves are used to modify the generic head model articulation of the matching phonemes.

Where possible, the floating point vectors representing the control points associated with the phoneme transition motion path of the lips, mouth and jaw, can be used to modify other phoneme morph transitions, as a globally effective modifier. This permits the reference facial lip motion model for all phoneme transitions to be matched closely to the actor using only a limited subset of phoneme transition examples from the archival footage. This is accomplished by associating all points as control points as relative percentage offsets from a human head reference model, and these control point offsets are globally associated with other control points for any speech utterance. When any point is moved, as associated with a given speech utterance, other points are known to also move with some associated probability as to where they will move as a group, for the associated phoneme or phoneme-to-phoneme transition.

The flock or group behavior of control points of facial motion permits the animation system to change one point position and have other facial points match, as indexed to a given speech transition. Speech phoneme transitions identified for a screen actor, have motion paths which are applied to the wireframe animation model of the actor muzzle. These motion paths are saved as complex spline curves. The motion paths of many points are differently associated in different phoneme transitions. Some, but usually not all phoneme transition paths are estimated from a screen actor. The limited sample of motion paths from the screen actor can be used to globally modify the motion paths during morphing of the 3D wireframe facial muzzle model. The wireframe model is locked to the texture map viseme image (FIG. 1, Block 350). The viseme index frames, placed to their target index frames in the footage to be modified, are used as morph targets (FIG. 1, Block 320, 330, 350).

The morph animation subsystem imports the motion paths to be used for the morph transitions, some paths of which are reference paths matched to the actor and some paths of which are captured and reproduced to match the screen actor from the archival footage or newly generated reference footage (FIG. 1, Block 360).

The morph animation subsystem generates and renders all intermediary frames between the viseme index frames. The viseme texture map image is already correctly colored, shaded, textured and stitched to the original actor face for each index viseme. The 2D viseme is already mapped to the 3D wireframe muzzle model. The wireframe is already match moved to the correct position and orientation and scale of the original actor screen image (FIG. 1, Block 360). The morphed and rendered frames between viseme index frames are checked by a human operator for any final optical, textural, shading, or stitching touch up to be done by hand, if necessary (FIG. 1, Block 370 and 380).

Figure 2:
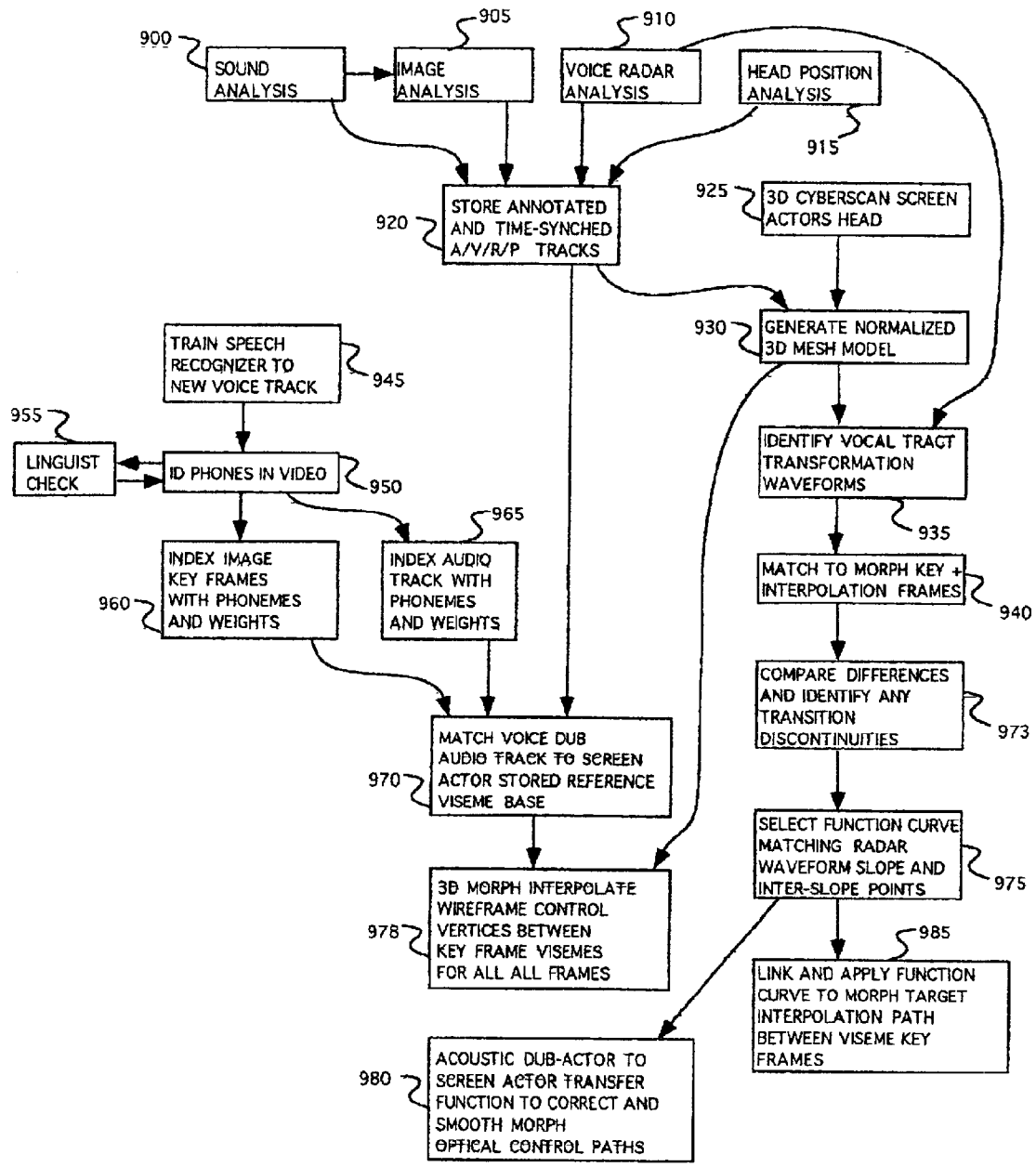
FIG. 2; is a block diagram of the system using radar.

Referring now to FIG. 2 showing Radar Aided Viseme Morphing, the production system engages in an analysis stage, where the actor audio video track sound (FIG. 2, Block 900) is analyzed, the image frames 905 are analyzed, the actor voice radar measurements (FIG. 2, Block 910) are analyzed and the actor head position and orientation (FIG. 2, Block 915) are analyzed and located in the image frames for all frames to be modified. The analytic results are annotated as such in the original audio video track using a database. All annotations are synchronized or time synched to the speech tracks to be modified.

In addition, the dub track actor's speech is measured in real-time using radar sensors in order to identify mouth and vocal tract shapes during the dub speech, and thereby identify the vocal tract transformation waveforms (FIG. 2, Block 935). A 3D wire frame mesh model of the actor's head is generated using the Cyberscan system (FIG. 2, Block 925). The stored (FIG. 2, Block 920) audio video tracks for the actor provides means to identify and select a set of visemes for the actor. The set of visemes is derived by using the actor image frames which are uttering each phoneme which has a unique face and mouth shape. If the image frames of the original audio video track of the original actor are all that is available, then a same sized and front facing set of visemes must be derived from the original footage. This is accomplished by means of applying size scaling and three dimensional orientation correcting affine transformations to the original video face image to correct for size, orientation. This produces a standard set of visemes to be used for the actor face that will be used to synthesize and synchronize the new speech track animation. Alternatively, if the original footage actor is available, then a standard set of visemes can be elicited from the actor that are captured as face-front, identical oriented, thereby eliminating the need for the use of mathematical transformations using an affine transform for example, and thus increasing the reference viseme quality and accuracy.

Further analysis is performed. Using automatic speech recognition techniques (ASR), the recognizer is trained (FIG. 2, Block 945) to recognize and time index phonemes in the new voice track dub actor speech, and also in the screen actor original speech audio video (FIG. 2, Block 950) track. If needed for accuracy over existing ASR techniques, a linguist (FIG. 2, Block 955) may be employed to check the accuracy and quality of ASR phoneme analysis output. Once the phones (phonemes) are identified in the original actor speech track (FIG. 2, Block 950), the database of the audio video track is annotated and key frame indexed (FIG. 2, Block 960) and the audio track is also annotated and audio weighted phoneme time indexed (FIG. 2, Block 965). Once the phones (phonemes) are identified in the new dub actor voice track, the dub audio track, but not with any visual component, is stored as a similarly annotated and audio weighted phoneme time indexed track (FIG. 2, Block 965).

In FIG. 2 Radar Aided Viseme Morphing, the production system engages in a synthesis stage, where phonemes identified (FIG. 2, Block 945) in the dub actor new speech track are used to select original screen actor visemes corresponding to the dub actor speech utterance (FIG. 2, Block 970). The wire frame mesh model of the facial muzzle of the original screen actor (FIG. 2, Block 930) is used to match-move and scale and orient the screen actor visemes to the matching position of the screen actor head in the original image frames. This is accomplished since the wire frame mesh model is locked using a series of wire frame control vertices to a corresponding texture map of the actor face. The texture map thereby automatically corresponds to the visemes used. Once the original screen actor viseme has been selected (FIG. 2, Block 970) using the dub track phoneme identification data (FIG. 2, Blocks 950, 960, and 965), and match moved and oriented to original screen actor head position for that image frame, the viseme texture map is applied and altered using image modification techniques such as those provided in the Adobe Photoshop 6.0 software tool, such that the altered texture map for the selected reference viseme seamlessly overlays and stitches into the original texture and color and hue and lighting of the original screen actor head footage. This process selects the visemes for the new audio track, modifies the scale and orientation and texture map of the viseme to match the original screen actor. The match moved and match textured visemes of the screen actor are indexed to frames in the audio video footage (FIG. 2, Block 970). The continuous radar measurement data for the dub actor lip and vocal tract motion speech is scaled to match the absolute dimensions of the screen actor lip and vocal tract motion range. This screen actor normalized radar measurements derived from the dub actor speech, are used to control the optical motion path of wire mesh control points between actor visemes, thereby providing an accurate and continuous viseme to viseme optical transformation path. This is accomplished by taking the dub actor radar measurements that have been normalized to match the screen actor vocal tract dimensions (FIG. 2, Block 935). By using the actor visemes as morph transformation beginning and ending points, and using the continuous and now screen actor normalized radar measurements, the morph optical transformation flow paths for all control vertices of the screen actor are identified for all intervening image frames between viseme frames. This effects control of the exact optical path of all associated control vertices of the screen actor viseme to viseme image tranformations to correspond to the radar dimensions of the actual dub actor. This only requires the dimensional measurements to be matched (FIG. 2, Block 940) to each viseme for the screen actor and then the intervening image frames to be synthesized have their control vertices optical flow path match the three dimensional measurement changes of the radar measurements from the dub actor after having been normalized in dimensional range to that of the screen actor. Occasionally, the synthesized images of the actor's face which are synchronized to the new voice dub track may not transition smoothly between (viseme A to viseme B) and then (viseme B to viseme C). While the optical paths for the A to B and B to C transitions are smooth within themselves, and accurate to the radar measurements that are used to control the optical path of the viseme to viseme morph, different sets of these viseme to viseme transformations, when time adjacently combined may introduce some degree of flutter or mismatch, which can be identified (FIG. 2, Block 973) and manually smoothed and matched. However, the use of radar to control the optical flow paths of viseme to viseme morph produces tracks with much less inherent flutter or slight visual distortion compared to other viseme and morph facial image animation concatenation methods. The dub actor radar measurements that are normalized to the screen actor vocal tract can be represented as a close matching or exact fitting function curve fitting associated slopes and inter-slope points. The identified function curves (FIG. 2, Block 975) for the dub speech has been normalized to match the actors dimensional range, and are used (FIG. 2, Block 985) to control and smooth the optical control paths of the screen actor wire frame intermediate viseme muzzle shapes. The match moved, scaled, oriented and texture matched three dimensional visemes are used as the morph key frames, and the optical morph transformation (FIG. 2, Block 978) is applied using the radar derived dimensional measurements to control the flow paths of control vertices between any time adjacent visemes. Further, the derived function curves that fit the radar measurements may not be avoided and the radar measurements themselves used. The radar track, after some dimensional normalization and scaling to match the screen actor, may be used directly. In this alternative embodiment, there is no need for deriving function curves (FIG. 2, Blocks 975, 985 and 990) to match the recorded dub actor radar measurements, and instead the radar measurements with some smoothing and base scaling, can be used as a direct controlling value in step (FIG. 2, Block 985) to control the change of shape of the screen actor intermediate synthesized images between viseme images in the image sequence.

The operation of the invention using radar proceeds as follows:

The radar process in FIG. 2 fits within the overall invention as diagrammed in FIG. 1 as alternative or adjunct method to non-radar techniques. The viseme and radar data are mutually indexed in time (FIG. 1, Blocks 290 and 300), or (FIG. 2 Block 920).

Radar measurements (waveforms) are taken by affixing a radar headset or related structure upon both the screen actor and voice actor's head. The radar headset or related structure supports the 3 EM sensors. The subject speaks according to a variety of project and technical goals as embodied in various scripts. (FIG. 1, Block 100).

The computer's data acquisition system acquires and stores the data in real-time for post capture processing (FIG. 2, Block 910).

The voice actor performs his or her voice role according to scripts for the scene as well as for a phonemically guided script. The screen actor reads a phonemically guided script. (FIG. 1, Block 100). The 3 channels of the radar signal and the microphone are recorded in a computer. The transfer function of the screen actor is calculated for each phoneme and di-phone. The radar waveforms are used to determine the movements, in real time, of the subject's jaw, tongue, and the glottal. The movement of the jaw is in exactly synchronous operation to the subject's voice. The captured jaw movement signal is used to "drive" the jaw graphical synthesis function of any corresponding screen actor or synthetic character's jaw movement (FIG. 1, Block 360), and (FIG. 2, Block 978).

The tongue and glottal measurement as well as the subject's acoustic signal are used to derive a complex transfer function. The subject's transfer function is an accurate description (signature) of the subject's voice. It can be used to transform the voice actor's speech into that of the screen actor's, thereby appearing to the audience that the screen actor (whose voice they know) speaks the language, including it's nuances, of the voice actor.

The facial animation of the screen actor is indexed to the 3 channels of the voice actor's radar signals (FIG. 2, Block 920). The jaw and lips of the voice actor are used to drive (through a variety of software processes) the jaws and lips of the screen actor (FIG. 1, Block 310), and (FIG. 2, Blocks 970, 978). The glottoral signal of the voice actor is used to drive through the screen actor's phonemically index set of transfer functions to produce the voice of the screen actor sounding like the voice actor but speaking the language and nuance of the voice actor.

The radar sensors used (FIG. 2, Block 910) comprise, for instance, a 0.5 diameter dipole transmit and receive antennae and coaxial cables. There is one radar sensor per location on the human head with up to 3 per head. These sensors are manufactured by LLNL for internal use.

A micro-power 0.3 milli-watt transmitter operating at 2 Ghz. A Homodyne transmit-receive mode is used. Analog filters of 70–7000 Hz and 2 to 10 Hz are used to process the output. LLNL manufactures these for it's internal use.

There is utilized a radar sensor headset or related structure for holding in place the 3 EM sensors, in which one is located on the throat, another located under the chin, and the third is located directly in front of the lips.

A computer analog interface comprised of 3 A/D channels operating at ±1 volt Pk—Pk input, at 1000 samples/second at 16 bits, as manufactured by National Instruments, is used to transfer the signal readings to a computer. Data acquisition comprised of software capable of reading and buffering the 3 A/D channels of 1000 samples/second at 16 bits is manufactured by National Instruments.

There is utilized a microphone on the headset with another one also mounted nearby on a microphone stand.

A digital audio interface is used to also capture and store digital audio (FIG. 2, Block 900) at up to 44 k Samples-per-second (CD quality) at mono-16 bits. Data storage (FIG. 2, Block 920) comprises standard computer hard drives such as under Windows or Apple OS.

A radar waveform display is comprised of a multi-channel audio type display, such as manufactured by Sound Forge or National Instruments.

A radar data processor for transforming and interfacing (FIG. 2, Blocks 920, 930, and 935) to the 3D morph software is comprised of custom software written to take in the radar digital data and scale and provide files or buffers of said data to the 3d morph software. 3D morph software is comprised of Pixels3D or Maya with interface, for reading processed and buffered radar data and/or its scaled and transformed data.

The radar signal can be captured, stored and processed (FIG. 2, Block 920) using a Windows PC or Apple Macintosh to collect, store, view and process the data. Sound Forge or National Instruments software can be used to collect and view the data. Software for post-processing the radar signal data (transform the data to make it suitable for the 3d morph process) can be written in C, Perl, TKL, Applescript or Java langauges.

Audio transformation of the voice actor's voice into that of the screen actor's voice can be implemented by custom DSP code as embodied in a DirectX plug-in, in Sound Forge on Windows or in National Instruments' Labview. The DSP code would provide, in real time, an execution of the voice actor to screen actor's transfer function, as calculated in the complex signal domain.

The radar data is used for two diverse processes. One process is for directly driving facial animation (FIG. 1, Block 360) and (FIG. 2, Blocks 910, 920, 970, and 978). The second process is for deriving both the voice and screen actor's speech signatures, which in turn is used for transforming the voice actor's speech into the screen actor's speech, and is accomplished using available techniques such as those provided by Prosoniq's Time Factory software for example.

For facial animation the jaw and lips radar signal data is used to automate the opening and closing of the screen actor's jaws and lips (FIG. 2, Block 970, 978). The raw jaw and lips radar signal data is processed for scaling and is time (frame) locked with the screen actor's moving images (FIG. 2, Block 920). This function allows the screen actor's face to be in literal synchronous operation to that of the voice actor's jaw and lips (FIG. 2, Block 970 and 978). In addition the glottoral signal of the voice actor's speech allows for a transformative syncing of the screen actor's face to that of the voice actor's face (FIG. 2, Block 980).

For speech transformation the transfer function derived for each phoneme from the screen actor is fed the glottoral, jaw and lips signal obtained from the voice actor's speech using the EM sensor headset. The glottoral signal drives the transfer function to create the screen actor speaking in the pitch of the voice actor. In addition the movement of the voice actor's jaw and lips is used to select the corresponding screen actor's transfer function. The combination of the voice actor's glottoral signal driving the phoneme indexed screen actor's transfer, produces speech that sounds like the screen actor but has the language and the nuance of the voice actor's speech.

The foregoing aspects of the invention are preferably implemented in a computer system that is programmed to perform the functions of speech recognition, image morphing, and database for integrated radar measurements capture. The output actor screen image track that is synchronized to the new dub audio track can be initially stored in the computer system's memory but later transferred to some other medium for playback such as video tape.

While the invention has been described in reference to audio-visual dubbing, it can also be applied to other uses, such as foreign language learning or speech therapy for example.

It will be appreciated by those of ordinary skill in the art that the present invention can be embodied in other forms without departing from the spirit or required characteristics thereof. For example, although eigenvalue vector estimation and radar dimensional measurement are described as suitable implementations for identifying and mapping the location of control vertices on an actors facial image, a different boundary detection algorithm and a different means to measure lip motion dynamics may be employed for this purpose, but still retain the fundamental characteristic of the present invention to use a captured continuous dynamic measured motion path however derived from a dub actor's speech in order to more accurately and realistically control the motion animation of a screen actor's face and lips to synchronize to the new dub speech track.

The presently disclosed embodiments are therefore considered in all respects to be illustrative and not restrictive.

We claim:

1. A method for modifying an audio visual recording originally produced with an original audio track of an original speaker, using a second audio dub track of a second speaker, to produce a new transformed audio visual recording with synchronized audio to facial expressive speech of the second audio dub track spoken by the original speaker, comprising analyzing the original audio track to convert it into a continuous time coded facial and acoustic symbol stream to identify corresponding visual facial motions of the original speaker to create continuous data sets of facial motion corresponding to speech phoneme utterance states and transformations, storing these continuous data sets in a database, analyzing the second audio dub track to convert it to a continuous time coded facial and acoustic symbol stream, using the second audio dub track's continuous time coded facial and acoustic symbol stream to animate the original speaker's face, synchronized to the second audio dub track to create natural continuous facial speech expression by the original speaker of the second dub audio track.

2. The method of claim 1 wherein said second audio dub track is spoken in a language different from that of the original speaker.

3. The method of claim 1 wherein said continuous time coded facial and acoustic symbols comprise diphones and visemes.

4. The method of claim 1 wherein said continuous time coded facial and acoustic symbols comprise triphones and visemes.

5. The method of claim 1 comprising using a set affixed facial reference points to track the facial transformation from one continuous time coded facial and acoustic symbol to another continuous time coded facial and acoustic symbol.

6. The method of claim 5 comprising using a computer motion tracking system to record the optical flow path for each fixed reference point.

7. The method of claim 1 further comprising using a set of fixed facial reference points to track the facial transformation from one continuous time coded facial and acoustic symbol to another continuous time coded facial and acoustic symbol.

8. The method of claim 7 further comprising accumulating a database of recorded mouth transformation optical flow paths associated with continuous time coded facial and acoustic symbols.

9. The method of claim 5 further comprising adding an emotional elicitation process by using a computer motion tracking system to record a number of facial control points for each emotion.

10. The method of claim 9 in which the facial control points comprise, but are not limited to, the chin, teeth, inner lips, outer lips, cheeks and jowls.

11. The method of claim 7 comprising accumulating a database of visemes by recording the facial control points corresponding to each continuous time coded facial and acoustic symbol.

12. The method of claim 11 comprising accumulating a database of muzzle patches by mapping the facial control points for each viseme.

13. The method of claim 12 comprising selecting muzzle patches from the speaker's viseme database based on the second dub audio track and continuous time coded facial and acoustic symbol to viseme sequence and applying the selected muzzle patches onto a three dimensional facial muzzle model.

14. The method of claim 13 further comprising also collecting a set of patches of light, color and texture from the sampled first speaker's muzzle patches.

15. The method of claim 1 in which the fixed reference points for both speakers are mapped using radar.

16. The method of claim 15 in which the dub audio track radar measurements are referenced to a particular continuous time coded facial and acoustic symbol or symbol to symbol transitions.

17. A method for modifying an audio visual recording originally produced with an original audio track of an original screen actor, using a second audio dub track of a second screen actor, to produce a new transformed audio visual recording with synchronized audio to facial expressive speech of the second audio dub track spoken by the original screen actor, comprising analyzing the original audio track to convert it into a continuous time coded facial and acoustic symbol stream to identify corresponding visual facial motions of the original speaker to create continuous data sets of facial motion corresponding to speech utterance states and transformations, storing these continuous data sets in a database, analyzing the second audio dub track to convert it to phonemes as a time coded phoneme stream a continuous time coded facial and acoustic symbol stream, using the second audio dub track's continuous time coded facial and acoustic symbol stream to animate the original screen actor's face, synchronized to the second audio dub track to create natural continuous facial speech expression by the original screen actor of the second dub audio track.

18. The method of claim 17 comprising using a computer vision system to track and record a database of visemes of the actors' head position, facial motions of the jaw, and the lip motion during speech for each continuous time coded facial and acoustic symbol.

19. The method of claim 18 comprising tracking fixed reference control points on the head, jaw and lips.

20. The method of claim 19 in which the reference control points comprise the outside edge of the lips, the inside edge of the lips, the edge of the chin, the tip of the tongue, the bottom edge of the upper teeth, the upper edge of the lower teeth, the cheeks and jowls, the nose and the eyes.

21. The method of claim 20 comprising accumulating a database of muzzle patches by mapping the facial control points for each viseme.

22. The method of claim 21 comprising selecting muzzle patches from the speaker's viseme database based on the second dub audio track and continuous time coded facial and acoustic symbol to viseme sequence and applying the selected muzzle patches onto a three dimensional facial muzzle model.

23. The method of claim 22 further comprising also collecting a set of patches of light, color and texture from the sampled first speaker's muzzle patches and applying these patches based on the second dub audio track.

24. The method of claim 19 in which the fixed reference points for both actors are mapped using radar.

25. The method of claim 24 in which the dub audio track radar measurements are referenced to a particular phoneme or phoneme to phoneme transition in time continuous time coded facial and acoustic symbol or symbol to symbol transition.

26. The method of claim 24 in which the radar mapping information is transferred to an animation control mixer.

27. The method of claim 24 in which the viseme database information is transferred to an animation control mixer.

28. The methods of claim 1 or 17 comprising using head modeling to aid in positioning three dimensional visemes.

29. The methods of claim 1 or 17 comprising modeling multiple floating point control vertices relative to a generic head shape and relative on a variety of speech viseme standards.

30. The methods of claim 1 or 17 comprising texture sampling target footage to texture match visemes.

31. A method for modifying an audio visual recording originally produced with an original audio track of an original screen actor, using a second audio dub track of a second screen actor, to produce a transformed audio visual recording with synchronized audio to facial expressive speech of the second audio dub track spoken by the original screen actor, comprising analyzing the original audio track to convert it into a continuous time coded facial and acoustic symbol stream, identifying corresponding visemes of the original screen actor, using radar to measure a set of facial reference points corresponding to speech continuous time coded facial and acoustic symbol utterance states and transformations, storing the data obtained in a database, analyzing the second audio dub track to convert it to phonemes a continuous time coded facial and acoustic symbol stream, identifying corresponding visemes of the second screen actor, using radar to measure a set of facial reference points corresponding to speech facial and acoustic symbol utterance states and transformations, storing the data obtained in a database, using the second audio dub track time-coded continuous time coded facial and acoustic symbol stream and the actors visemes to animate the original screen actor's face, synchronized to the second audio dub track to create natural continuous facial speech expression by the original screen actor of the second dub audio track.

32. The method of claim 31 in which the database resides in an animation control mixer.

33. The method of claim 31 in which the facial reference points comprise the outside edge of the lips, the inside edge of the lips, the edge of the chin, the tip of the tongue, the bottom edge of the upper teeth, the upper edge of the lower teeth, the cheeks and jowls, the nose and the eyes.

34. The method of claim 31 comprising texture sampling target footage to texture match visemes.

* * * * *